US011277380B2

(12) United States Patent
Engan et al.

(10) Patent No.: US 11,277,380 B2
(45) Date of Patent: Mar. 15, 2022

(54) ADAPTIVE MALICIOUS NETWORK TRAFFIC RESPONSE

(71) Applicant: T-Mobile USA, Inc., Bellevue, WA (US)

(72) Inventors: Michael Engan, Bellevue, WA (US); Michael Kary, Redmond, WA (US); James Latham, Redmond, WA (US); Brett Peppe, Middleburg, VA (US); Douglas McDorman, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 255 days.

(21) Appl. No.: 16/222,524

(22) Filed: Dec. 17, 2018

(65) Prior Publication Data
US 2020/0195671 A1    Jun. 18, 2020

(51) Int. Cl.
*H04L 29/06*    (2006.01)
(52) U.S. Cl.
CPC ...... *H04L 63/0236* (2013.01); *H04L 63/0876* (2013.01); *H04L 63/108* (2013.01); *H04L 63/1416* (2013.01); *H04L 63/1425* (2013.01); *H04L 63/1491* (2013.01)
(58) Field of Classification Search
CPC . H04L 63/0236; H04L 63/101; H04L 63/108; H04L 63/1466; H04L 63/1491; H04L 63/1425; H04L 63/0876; H04L 63/1416; H04L 63/20; H04L 63/0861; H04L 63/083; H04W 12/0808
See application file for complete search history.

(56) References Cited

U.S. PATENT DOCUMENTS

| 9,152,808 | B1* | 10/2015 | Ramalingam | ....... H04L 63/1441 |
| 10,116,699 | B1* | 10/2018 | Paterson | ............. H04L 63/1491 |
| 2003/0208684 | A1* | 11/2003 | Camacho | ............. G06Q 20/401 |
| | | | | 713/186 |

(Continued)

OTHER PUBLICATIONS

Nakakoji, Hirofumi; Fujii, Yasuhiro; Isobe, Yoshiaki; Shigemoto, Tomohiro; Kito, Tetsuro; Hayashi, Naoki; Kawaguchi, Nobutaka; Shimotsuma, Naoki; Kikuchi, Hiroaki; "Proposal and Evaluation of Cyber Defense System using Blacklist Refined Based on Authentication Results", 19th International Conference on Network-Based Information Systems (NBiS), IEEE, Sep. 7-9, 2016, pp. 135-139.*

(Continued)

*Primary Examiner* — Victor Lesniewski
(74) *Attorney, Agent, or Firm* — Han Santos, PLLC

(57) ABSTRACT

An adaptive greylist may be used to reject authentication requests that originate from a source network address that has been taken over by a malicious actor. A percentage of successful authentications for a predetermined number of authentication requests that last originated from a source network address may be calculated. Accordingly, the source network address may be added to a greylist of suspended network addresses when the percentage of successful authentications is less than a predetermined percentage threshold. On the other hand, the source network address is kept off the greylist of suspended network addresses when the percentage of successful authentications is equal to or greater than the predetermined percentage threshold.

20 Claims, 5 Drawing Sheets

(56) References Cited

U.S. PATENT DOCUMENTS

| | | | | |
|---|---|---|---|---|
| 2009/0245176 A1* | 10/2009 | Balasubramanian | | H04W 48/20 370/328 |
| 2009/0288150 A1* | 11/2009 | Toomim | | G06F 21/6218 726/5 |
| 2010/0211996 A1* | 8/2010 | McGeehan | | H04L 63/107 726/4 |
| 2013/0232574 A1* | 9/2013 | Carothers | | H04L 63/1441 726/22 |
| 2013/0303204 A1* | 11/2013 | Dudley | | H04L 51/12 455/466 |
| 2014/0359708 A1* | 12/2014 | Schwartz | | G06F 15/173 726/4 |
| 2015/0089625 A1* | 3/2015 | Swanson | | H04L 63/0227 726/11 |
| 2015/0350213 A1* | 12/2015 | Varadarajan | | H04L 63/1416 713/189 |
| 2016/0072837 A1* | 3/2016 | Arrowood | | H04L 63/1416 726/23 |
| 2017/0208083 A1* | 7/2017 | Gurney, III | | H04L 63/0236 |
| 2018/0262971 A1* | 9/2018 | Aihara | | H04W 12/122 |
| 2019/0116156 A1* | 4/2019 | Glazemakers | | H04L 63/20 |
| 2019/0158501 A1* | 5/2019 | Peppe | | H04L 63/083 |
| 2019/0334943 A1* | 10/2019 | Arvanites | | H04W 12/06 |
| 2020/0007548 A1* | 1/2020 | Sanghavi | | H04L 63/0209 |
| 2020/0134165 A1* | 4/2020 | Boodaei | | H04L 63/083 |

OTHER PUBLICATIONS

Akiyama, Mitsuaki; Yagi, Takeshi; Hariu, Takeo; "Improved Black-listing: Inspecting the Structural Neighborhood of Malicious URLs", IT Professional, vol. 15, Issue 4, IEEE, Dec. 4, 2012, pp. 50-56.*

* cited by examiner

ADAPTIVE MALICIOUS NETWORK TRAFFIC RESPONSE

BACKGROUND

Cybersecurity is increasingly a priority for both public and private organizations that utilize web-based resources. At the same time, cyberattacks have increased and become more sophisticated. Organizations may attempt to combat cyberattacks by classifying login attempts into blacklists and whitelists. The blacklists have known malicious actor network addresses and the whitelists include network addresses of known authorized users. Accordingly, an organization may always deny login attempts from a blacklist of network addresses, while always allow login attempts from a whitelist of network addresses.

However, cybersecurity attacks have evolved to take advantage of multiple attack vectors and attack strategies. For example, malicious actors may use automated scripts to harvest authentication credentials of users from some websites, and then collect these authentication credentials into lists. Alternatively, malicious actors may acquire lists of authentication credentials from other malicious third parties. Malicious actors then automate attacks using these lists of authentication credentials in an effort to gain access to other websites. Accordingly, organizations are experiencing ever-increasing numbers of automated malicious attempts to gain unauthorized access to network resources.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
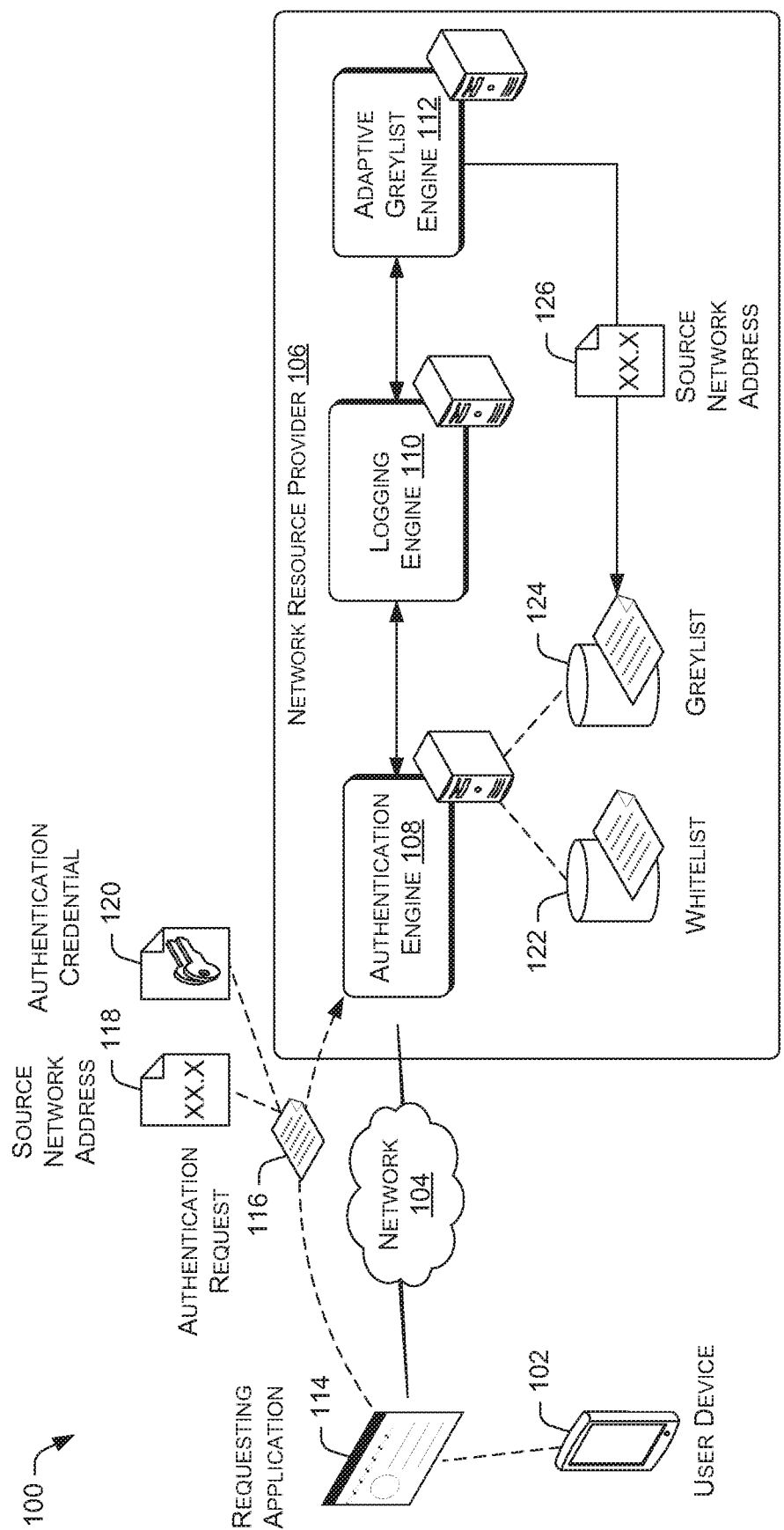
FIG. 1 illustrates an example network architecture for implementing adaptive malicious network traffic response to mitigate malicious login attempts.

This disclosure is directed to techniques for using adaptive malicious network traffic response to mitigate malicious login attempts. In various embodiments, a network resource provider may use an adaptive greylist that contains suspended network addresses to determine whether an authentication request initiated by a requesting application at a source network address is to be rejected. A source network address may be an Internet Protocol (IP) address that is assigned to a user device by a computer network that uses IP for communication, or an equivalent numerical address identifier that is assigned by the computer network for communication purposes. The network resource provider may add a source network address to the adaptive greylist when a predetermined percentage of authentication requests that are last initiated at the source network address fail. The failures of the authentication requests may be due to the authentication request submitting an incorrect authentication credential to the network resource provider. The amount of time that the source network address remains on the greylist before being removed from the greylist may be dependent on how many times the source network address has been previously added to the greylist. During the duration of time that a particular source network address is on the greylist of suspended network addresses, the network resource provider may reject any authentication request that originates from the particular source network address regardless of the validity of the authentication credential that is submitted via the authentication request. For example, the authentication credential may include a user identifier, a password, biometric data, authentication token, a combination of a user identifier and a password, or a combination of a user identifier and biometric data, or other combinations thereof, that are provided to authenticate a user to the network resource provider.

In other embodiments, the network resource provider may determine whether a predetermined percentage of network addresses that belong to a specific block of network addresses have been added to a greylist of suspended network addresses. For example, the specific block of network addresses may be a subnet of network addresses, a domain of network addresses, or some other designated range of network addresses. Accordingly, the network resource provider may add the entire block of network addresses to the greylist when the network resource provider determines that the predetermined percentage of network addresses have already been added.

The use of an adaptive greylist to temporarily reject authentication requests that originate from a specific source network address may reduce instances of "Hack and Harvest" attacks. A "Hack and Harvest" is a cyberattack in which a malicious actor obtains the authentication credentials of unsuspecting users of a particular network service, and then uses the authentication credentials to try to gain access to other network services. A "Hack and Harvest" attack relies on the fact that users often reuse the same authentication credentials for multiple network resources provided by different network resource providers. Further, a malicious actor often carries out a series of "Hack and Harvest" attacks from the same compromised source network address. Therefore, the use of the adaptive greylist to reject authentication requests from a specific compromised source network address may significantly reduce the amount of malicious network traffic that is experienced by a network resource provider. The techniques described herein may be implemented in a number of ways. Example implementations are provided below with reference to the following figures.

Example Network Architecture

FIG. 1 illustrates an example architecture 100 for implementing adaptive malicious network traffic response to mitigate malicious login attempts. The architecture 100 may include a user device 102, a network 104, and a network resource provider 106. The user device 102 may be a desktop computer, a laptop computer, tablet computer, a smartphone, a smartwatch, a personal digital assistant (PDA), or any other computing device that is capable of communicating with other devices via the network 104. The network 104 may include a wireless carrier network, a satellite network, a local area network (LAN), a larger network such as a wide area network (WAN), and/or a collection of networks, such as the Internet. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5$^{th}$ Generation (5G) wireless systems, CDMA-2000 (Code Division Multiple Access 2000), and/or so forth. The network resource provider 106 may provide network services and data to user devices, such as the user device 102. For example, the network resource providers may include web content providers, Application as a Service (ASP) providers, Software as a Service (SaaS) providers, and/or so forth. In some embodiments, the wireless carrier network may act as a network resource provider 106. The user device 102 may communicate with the network resource provider 106 via the network 104, in which the exchanged communication may include IP-based communication. The network resource provider 106 may operate an authentication engine 108, a logging engine 110, and an adaptive greylist engine 112. However, in alternative embodiments, one or more of the engines 108-112 may be operated by third-party service providers for the network resource provider 106. Each of the engines 108-112 may be implemented by one or more computing nodes.

In various embodiments, a requesting application 114 of the user device 102 may send an authentication request 116 to the network resource provider 106. The requesting application may be a client application, a web browser, an over-the-top (OTA) application, or some other type of application. The authentication request 116 may include a source network address 118 of the user device 102 and an authentication credential 120. In some embodiments, the source network address 118 may be an Internet Protocol (IP) address that is assigned to the user device 102 by the network 104. The authentication credential 120 may include a user identifier, a password, biometric data, authentication token, a combination of a user identifier and a password, or a combination of a user identifier and biometric data, or any other combinations thereof, that are provided by the requesting application 114.

The authentication request 116 may be received by the authentication engine 108 of the network resource provider 106. In one scenario, the authentication engine may be an End User Identification (EUI) system that is used by the network resource provider 106. In some embodiments, the authentication engine 108 may initially check the source network address 118 of the authentication request 116 against a whitelist 122 of authorized network addresses. Thus, if the source network address 118 is included in the whitelist 122, the authentication engine 108 may validate the authentication credential 120 to determine whether to grant the requesting application 114 access to data or services of the network resource provider 106. For example, the authentication engine 108 may compare a submitted authentication credential that includes a combination of username and password to stored authorized credentials that include combinations of usernames and passwords. Thus, if the submitted combination of username and password matches an authorized combination of username and password, the authentication engine 108 may determine that the authentication request is successfully validated as legitimate. Subsequently, the authentication engine 108 may grant the requesting application 114 access to the data or the services of the network resource provider 106. However, if the submitted combination of username and password fails to match any of the authorized combinations of username and password, the authentication engine 108 may determine that the submitted authentication credential is invalid and deny the requesting application 114 access to the data or the services.

However, if the source network address 118 of the authentication request 116 is not found in the whitelist 122, the authentication engine 108 may determine whether the source network address 118 is on a greylist 124 of suspended network addresses. Thus, if the source network address 118 is included in the greylist 124, the authentication engine 108 may reject the authentication request 116 without validating the authentication credential 120. In other embodiments, the authentication engine 108 may forego the use of the whitelist 122. Instead, as long as the source network address 118 is not present in the greylist 124, the authentication engine 108 may validate the authentication credential 120 of the requesting application 114 to determine whether the requesting application 114 is to be granted access. In some alternative embodiments, the authentication engine 108 may maintain a blacklist of banned source network addresses rather than the whitelist 122. In such embodiments, the authentication engine 108 may validate the authentication credential 120 of the requesting application 114 if the source network address 118 is not present on the greylist 124 and the blacklist.

In some embodiments, the authentication engine 108 may grant the requesting application 114 access to a decoy interface when the source network address 118 of the authentication request 116 is on the greylist 124. The granting of access to the decoy interface may be performed by the authentication engine 108 on a random basis without validating the authentication credential 120. In other words, some authentication requests initiated from a greylisted source network address are randomly granted access to the decoy interface based on the use of a random choice algorithm, while other authentication requests from the same greylisted source network address are simply rejected. The decoy interface may provide a restricted interaction environment with a set of restricted functionalities that mimic the features provided to a requesting application that provided a legitimate authentication credential. However, the decoy interface is disabled such that a requesting application is unable to access any data or services of the network resource provider 106. In some embodiments, the decoy interface may provide access to fictitious user account information that can be used to confuse a malicious party and/or help to track the malicious activities of the party.

In additional embodiments, the authentication engine 108 may be configured to accept account recovery requests from a source network address that is on the greylist 124, despite rejecting authentication requests from the same source network address. An account recovery request may include a request to email a password reset link to an associated email address that is on file with the authentication engine 108, text the password reset code to an associated telephone number that is on file with the authentication engine 108, and/or so forth. This is because a successful account recovery procedure may involve a user having user access to an additional user account, having user access to a specific user device, and/or the use of additional security questions and answers that are harder to circumvent by a malicious actor. Accordingly, the authentication engine 108 may provide the requesting application at the particular source network address with access to an account recovery function of the authentication engine 108 to retrieve an authentication credential in response to an account recovery request. For example, the account recovery function may be a user identifier recovery function, a password recovery function, and/or so forth.

The authentication engine 108 may report data regarding authentication requests, such as the authentication request 116, to the logging engine 110. The data for each authentication request may include a source network address of the authentication request, a date-time stamp of the authentication request, the authentication success status (i.e., success or failure) of the authentication request, the type of authentication credential submitted by the authentication request, and/or so forth. In turn, the logging engine 110 may store the data for the authentication requests in a data store or multiple data storage clusters.

The adaptive greylist engine 112 may request data regarding specific authentication requests from the logging engine 110 for analysis. In various embodiments, the adaptive greylist engine 112 may analyze the authentication success statuses for a predetermined number of authentication requests that last originated from a particular source network address 126. The analysis may be performed to determine a percentage of successful authentications for the predetermined number of authentication requests. The percentage of successful authentications may be further compared by the adaptive greylist engine 112 to a predetermined percentage threshold. Thus, if the percentage of successful authentications is less than the threshold, the adaptive greylist engine 112 may add the particular source network address 126 to the greylist 124. However, if the percentage of successful authentication is equal to or greater than the threshold, the particular source network address 126 is kept off the greylist 124 by the adaptive greylist engine 112. For example, the adaptive greylist engine 112 may analyze ten authentication requests that last originated from a specific source network address to determine that the percentage of successful authentication is 10%. Further, the adaptive greylist engine 112 determines that this successful authentication percentage is less than a threshold percentage of 90%. As such, the adaptive greylist engine 112 may add the specific source network address to the greylist 124.

In some embodiments, the amount of time that a source network address is kept on the greylist 124 may be dependent on the number of times that the source network address has been previously placed on the greylist 124 by the adaptive greylist engine 112. When the number of times is less than a predetermined threshold number of times, the adaptive greylist engine 112 may keep the source network address on the greylist 124 for a random time duration time that is shorter than or equal to a predetermined time duration threshold. Otherwise, the source network address may be kept on the greylist 124 for a time duration that is longer than the predetermined time duration threshold. For example, the first four times that a source network address is added to the greylist 124, the amount of time that the source network address is kept on the greylist 124 may randomly vary between one to seven days. However, when the source network address is added to the greylist 124 for the fifth time or more, the source network address may be kept on the greylist 124 for 30 days at a time.

Example Engine Components

Figure 2:
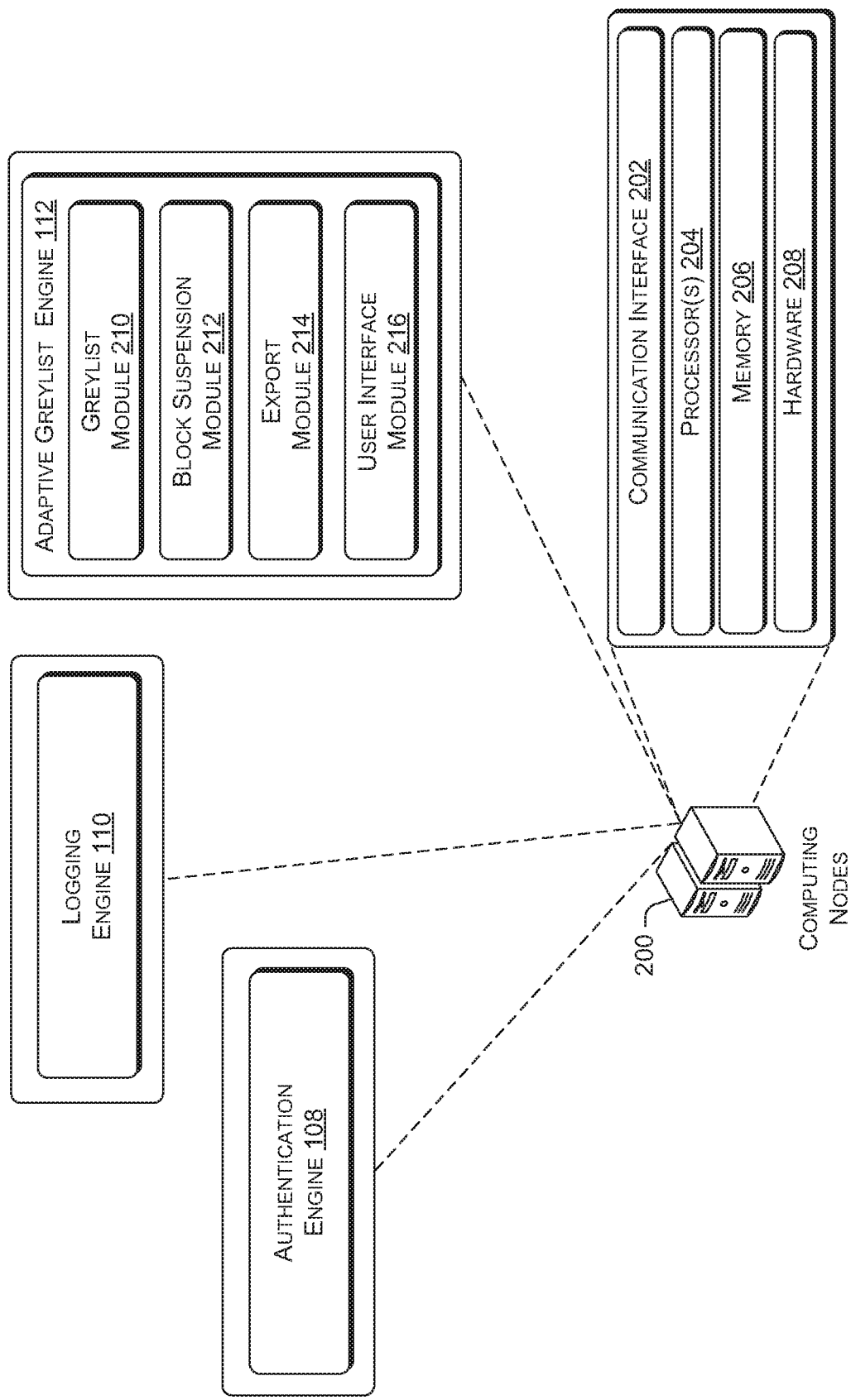
FIG. 2 is a block diagram showing various components of an adaptive greylist engine that implement adaptive malicious network traffic response to mitigate malicious login attempts.

FIG. 2 is a block diagram showing various components of an adaptive greylist engine that implement adaptive malicious network traffic response to mitigate malicious login attempts. The computing nodes 200 may include a communication interface 202, one or more processors 204, memory 206, and hardware 208. The communication interface 202 may include wireless and/or wired communication components that enable the computing nodes 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In some embodiments, the computing nodes 200 may include one or more computing servers. Alternatively, or concurrently, the computing nodes 200 or components thereof may be virtual computing devices in the form of virtual machines or software containers that are hosted in a computing cloud.

The computing nodes 200 may implement various back-end services and components of the network resource provider 106, such as the authentication engine 108, the logging engine 110, and the adaptive greylist engine 112. In some embodiments, one or more of the engines may be implemented individually or collectively as enterprise IT (EIT) applications that execute on the computing nodes 200. The adaptive greylist engine 112 may include a greylist module 210, a block suspension module 212, an export module 214, and a user interface module 216. The modules may include routines, code segments, program instructions, objects, and/or data structures that are executable by the processors 204 to perform particular tasks or implement particular abstract data types.

The greylist module 210 may add a source network address of authentication requests to the greylist 124 based on the percentage of successful authentications for a predetermined number of authentication requests that last originated from the source network address. A successful authentication of an authentication request occurs when the authentication credential of the authentication request is validated as legitimate by the authentication engine 108. In various embodiments, if the percentage of successful authentications is less than the threshold, the greylist module 210 may add the source network address to the greylist 124. However, if the percentage of successful authentications is equal to or greater than the threshold, the source network address is kept off the greylist 124 by the greylist module 210. In at least some embodiments, the percentage of successful authentications may be calculated for authentication requests that are received for a specific time frame, such as every minute, every hour, every day, etc.

In some embodiments, the amount of time that the greylist module 210 keeps a source network address on the greylist 124 may be dependent on the number of times that the source network address has been previously placed on the greylist 124. In such embodiments, the greylist module 210 may be configured to keep the source network address on the greylist 124 for a random time duration that is less than or equal to a predetermined time duration threshold when the number of times is less than a predetermined number of times. Otherwise, the greylist module 210 may be configured to keep the source network address on the greylist 124 for a time duration that is longer than the predetermined time duration threshold. Accordingly, the greylist module 210 may remove a source network address from the greylist 124 following the expiration of a corresponding amount of time. The removal of the source network address from the greylist 124 may restart the successful authentication percentage analysis by the greylist module 210 for the source network address. In other instances, the greylist module 210 may use other algorithms that take into account other historical traffic patterns from a source network address to make a decision as to whether to add the source network address to the greylist 124.

The block suspension module 212 may determine from the greylist 124 a percentage of network addresses in a specific block of network addresses that have been suspended, i.e., present on the greylist 124. In various embodiments, the specific block may be a subnet of network addresses, a domain of network addresses, or some other designated range of network addresses. The percentage is then compared by the block suspension module 212 to a percentage threshold. Thus, the block suspension module 212 may suspend the entire block if the percentage exceeds a predetermined percentage threshold. For example, the block suspension module 212 may determine that 60% of the network addresses in a specific block of network addresses are on the greylist 124. Since 60% exceeds a percentage threshold of 50%, the block suspension module 212 may add all of the network addresses in the specific block to the greylist 124. In some instances, the amount of time that a network address in the specific block remains on the greylist 124 is dependent on the number of times that the network address was previously on the greylist 124. In other instances, the addition of all of the network addresses in the specific block to the greylist 124 may result in a reset of the suspension time for each network address in the specific block to a new amount of suspension time, regardless of the amount of time that each of the network addresses has already spent on the greylist 124.

The export module 214 may include application program interfaces (APIs) that may be called upon by third-party applications to access the greylist 124. In various embodiments, a partner of the network resource provider 106 may use a third-party application that interfaces with the APIs to obtain real-time access to the greylist 124. The export module 214 may use an authentication mechanism to control the access to the greylist 124. Accordingly, the partner of the network resource provider 106 may register with the authentication mechanism in order to use a third-party application to access the greylist 124. In this way, the partner of the network resource provider 106 may use the greylist 124 to deny authentication requests from suspended network addresses. The user interface module 320 may enable an administrator to interact with the adaptive greylist engine 112 via user interface controls. Accordingly, the administrator may configure the time durations, percentages, and thresholds that are used by the various modules of the adaptive greylist engine 112.

Example Processes

Figure 3:
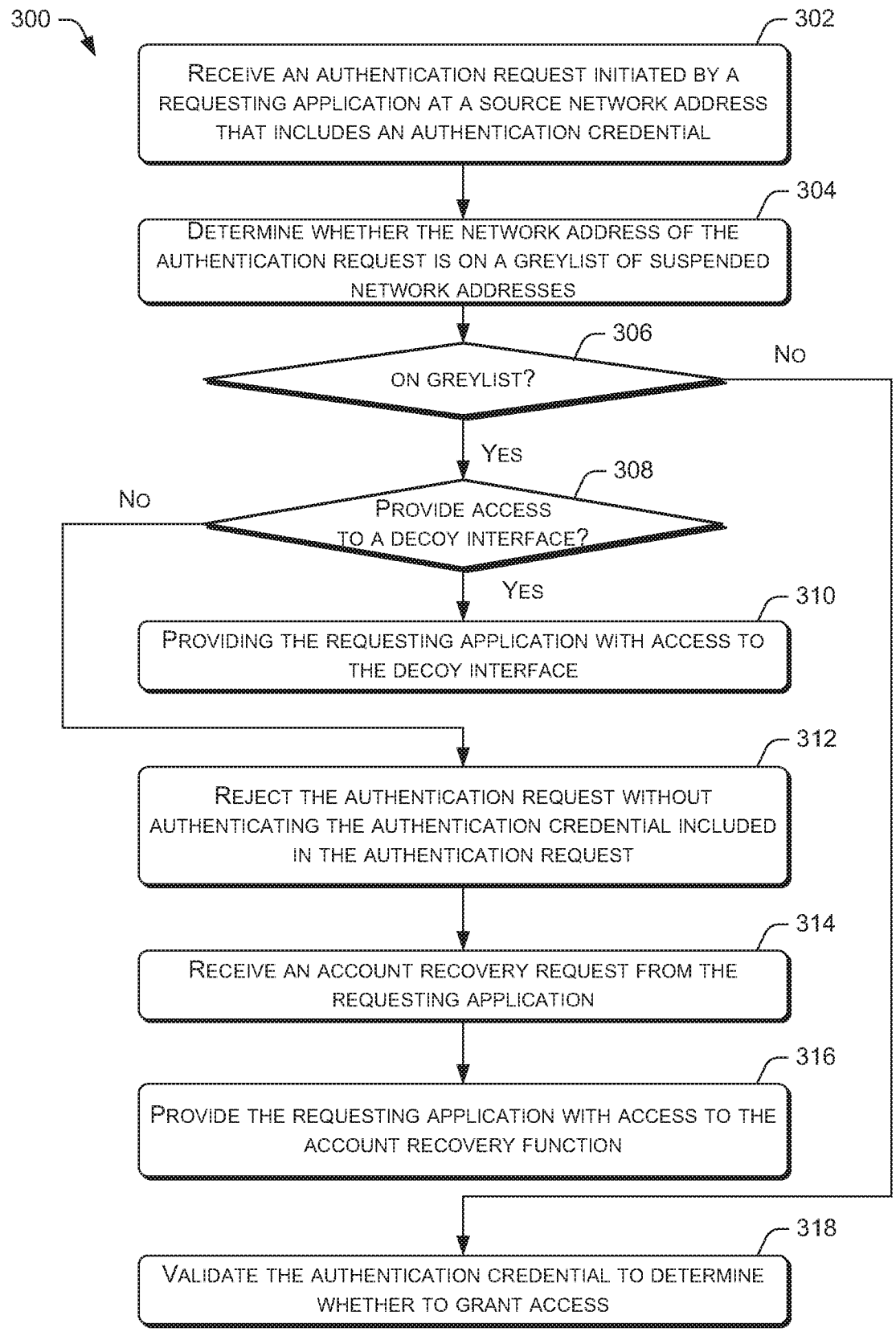
FIG. 3 is a flow diagram of an example process for using an adaptive greylist of suspended network addresses to process an authentication request to mitigate malicious login attempts.
Figure 4:
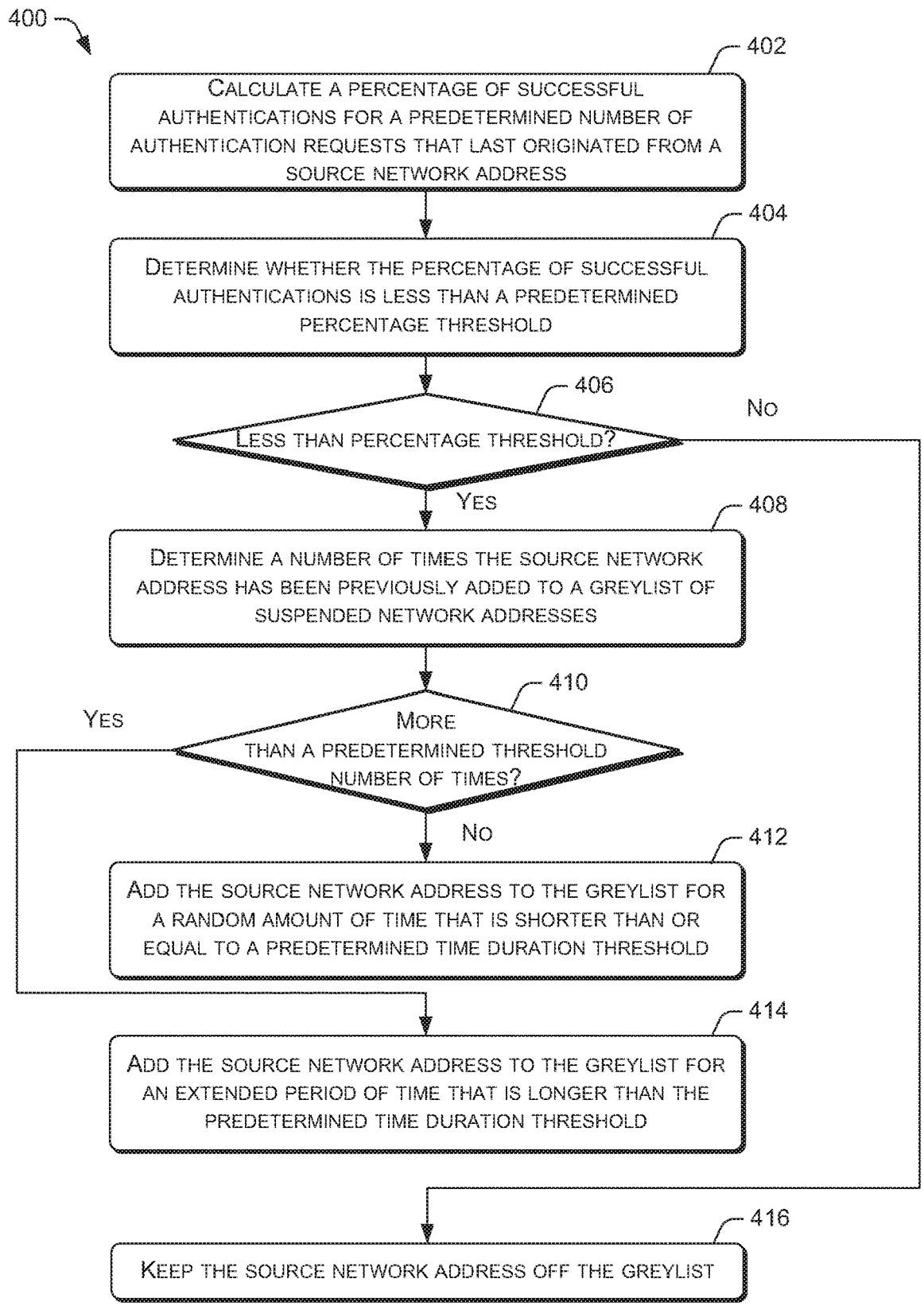
FIG. 4 is a flow diagram of an example process for determining whether to add a network address to a greylist of suspended network addresses based on previous network traffic from the network address.
Figure 5:
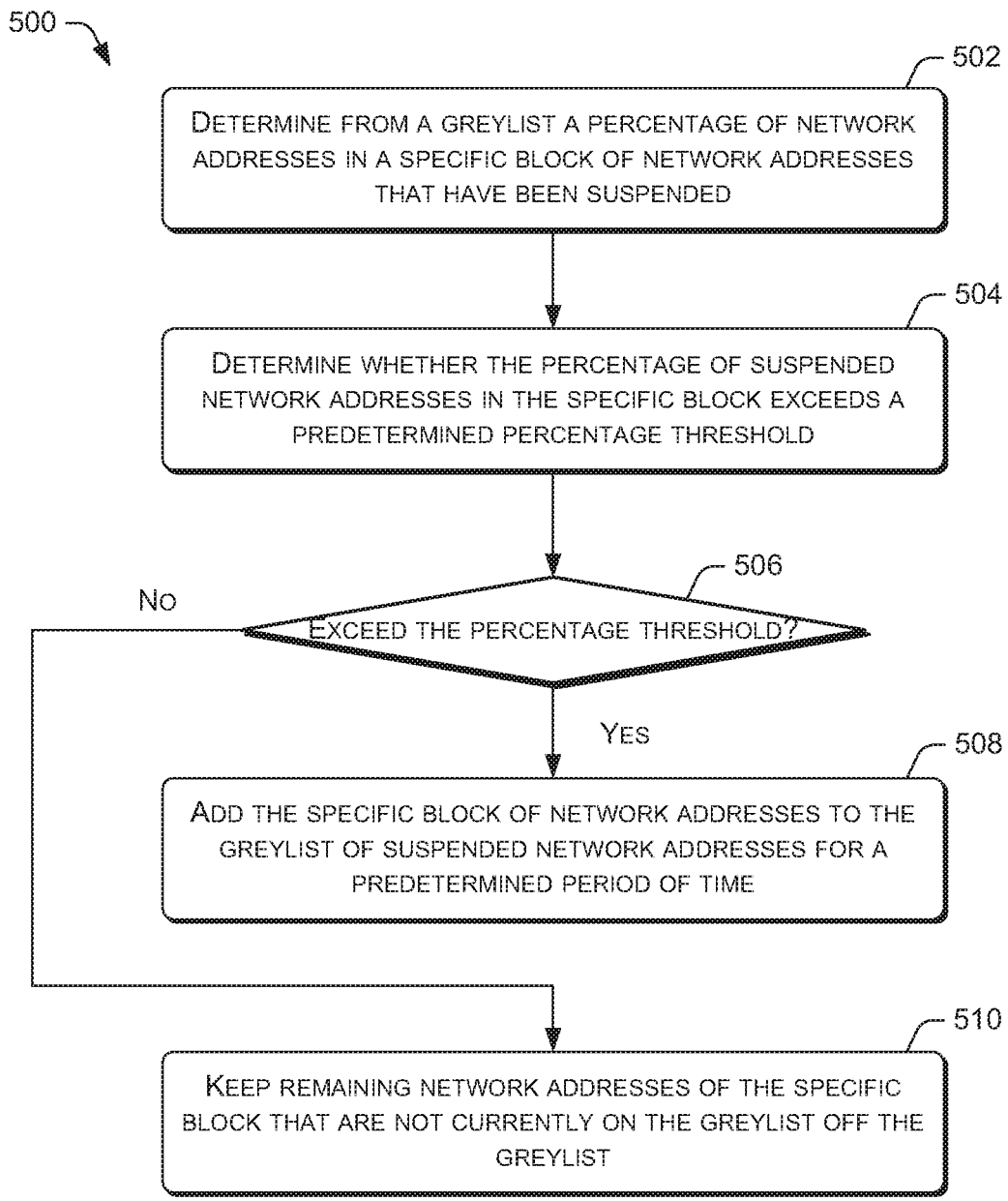
FIG. 5 is a flow diagram of an example process for determining whether to add a specific block of network addresses to a greylist of suspended network addresses based on prior network traffic from multiple network addresses.

FIGS. 3-5 present illustrative processes 300-500 for implementing adaptive malicious network traffic response to mitigate malicious login attempts. Each of the processes 300-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to the architecture 100 of FIG. 1.

FIG. 3 is a flow diagram of an example process 300 for using an adaptive greylist of suspended network addresses to process an authentication request to mitigate malicious login attempts. At block 302, a network resource provider 106 may receive the authentication request 116 that is initiated by the requesting application 114 at the source network address 118. The authentication request 116 may include the authentication credential 120. In various embodiments, a source network address may be an IP address that is assigned to a user device by the network 104, or an equivalent numerical address identifier that is assigned by the network 104 for communication purposes. The authentication credential 120 may include a user identifier, a password, biometric data, authentication token, a combination of a user identifier and a password, or a combination of a user identifier and biometric data, or any other combinations thereof.

At block 304, the network resource provider 106 may determine whether the network address 118 of the authentication request 116 is on the greylist 124 of suspended network addresses. During the duration of time that a particular network address is on the greylist of suspended network addresses, the network resource provider 106 may reject any authentication request that originates from the particular source network address regardless of the authentication credential that is submitted via the authentication request.

At decision block 306, if the source network address 118 is on the greylist 124 ("yes" at decision block 306), the process 300 may proceed to decision block 308. At decision block 308, the network resource provider 106 may determine whether to provide the requesting application 114 with access to a decoy interface. In various embodiments, the access to the decoy interface may be provided randomly by the network resource provider 106 via the use of a random choice algorithm. Thus, if the network resource provider 106 determines that requesting application 114 is to be provided with access to the decoy interface ("yes" at decision block 308), the process 300 may proceed to block 310. At block 310, the network resource provider 106 may provide the requesting application 114 with access to the decoy interface. In various embodiments, the decoy interface may provide a restricted interaction environment with a set of restricted functionalities that mimic the features provided to a requesting application that submitted a legitimate authentication credential. Nevertheless, the decoy interface is disabled such that the requesting application 114 is unable to access any data or services of the network resource provider 106.

However, if the network resource provider 106 determines that requesting application 114 is not to be provided with access to the decoy interface ("no" at decision block 308), the process 300 may proceed to block 312. At block 312, the network resource provider 106 may reject the authentication request 116 without validating the authentication credential 120 included in the authentication request 116. The rejection of the authentication request 116 means that the requesting application 114 is denied access to the data or the services provided by the network resource provider 106.

At block 314, the network resource provider 106 may receive an account recovery request from the requesting application 114. In various embodiments, the account recovery request may include a request to email a user identifier associated with an email address that is on file with the network resource provider 106 to the email address, email a password reset link to an email account that is on file with the network resource provider 106 as being associated with the user identifier, text the password reset link to a telephone number that is on file with the network resource provider 106 as being associated with a user identifier, and/or so forth, and/or so forth. At block 316, the network resource provider 106 may provide the requesting application 114 with access to an account recovery function of the network resource provider 106 in response to the account recovery request.

Returning to decision block 306, if the source network address 118 is not on the greylist 124 ("no" at decision block 306), the process 300 may proceed to block 318. At block 318, the network resource provider 106 may validate the authentication credential 120 included in the authentication request 116 to determine whether the requesting application 114 is to be granted access to the data or the services of the network resource provider 106. In various embodiments, the requesting application 114 is granted access when the authentication credential 120 is validated as legitimate. Otherwise, the requesting application 114 is denied access when the authentication credential is determined to be invalid. In some alternative embodiments, the network resource provider 106 may maintain a blacklist of banned source network addresses. In such embodiments, the process 300 may proceed to block 318 at decision block 306 when the source network address 118 is not on the greylist 124 and the blacklist.

FIG. 4 is a flow diagram of an example process 400 for determining whether to add a network address to a greylist of suspended network addresses based on previous network traffic from the network address. At block 402, the network resource provider 106 may calculate a percentage of successful authentications for a predetermined number of authentication requests that last originated from a source network address. A successful authentication occurs when the authentication credential of a corresponding authentication request is determined to be legitimate. In contrast, the authentication of an authentication request fails when a corresponding authentication credential included in the request is determined to be invalid.

At block 404, the network resource provider 106 may determine whether the percentage of successful authentications is less than a predetermined percentage threshold. At decision block 406, if the network resource provider 106 determines that the percentage is less than the predetermined percentage threshold ("yes" at decision block 406), the process 400 may proceed to block 408.

At block 408, the network resource provider 106 may determine a number of times the source network address has been previously added to the greylist 124 of suspended network addresses. At decision block 410, the network resource provider may determine whether the number of times is more than a predetermined threshold number of times. At decision block 410, if the network resource provider 106 determines that the source network address has not been previously added for more than the predetermined threshold number of times, i.e., less than or equal to the threshold ("no" at decision block 410), the process 400 may proceed to block 412. At block 412, the network resource provider 106 may add the source network address to the greylist 124 of suspended network addresses for a random amount of time that is shorter than or equal to a predetermined time duration.

However, if the network resource provider 106 determines that the source network address has been previously added to the greylist 124 for more than the predetermined threshold number of times ("yes" at decision block 410), the process 400 may proceed to block 414. At block 414, the network resource provider 106 may add the source network address to the greylist 124 for an extended period of time that is longer than the predetermined time duration threshold.

Returning to decision block 406, if the network resource provider 106 determines that the percentage of successful authentications is not less than the predetermined percentage threshold, i.e., equal to or greater than the threshold ("no" at decision block 406), the process 400 may proceed to block 416. At block 416, the network resource provider 106 may keep the source network address off the greylist 124. In other instances, the network resource provider 106 may use other algorithms that take into account other historical traffic patterns from the source network address to make a decision as to whether to add the source network address to the greylist 124.

FIG. 5 is a flow diagram of an example process 500 for determining whether to add a specific block of network addresses to a greylist of suspended network addresses based on prior network traffic from multiple network addresses. At block 502, the network resource provider 106 may determine from the greylist 124 a percentage of network addresses in a specific block of network addresses that have been suspended. In various embodiments, the specific block of network addresses may be a subnet of network addresses, a domain of network addresses, or some other designated range of network addresses. During the duration of time that a particular source network address is on the greylist 124, the network resource provider 106 may reject any authentication request that originates from the particular source network address regardless of the validity of the authentication credential that is submitted via the authentication request.

At block 504, the network resource provider 106 may determine whether the percentage of suspended network addresses in the specific block exceeds a predetermined percentage threshold. At decision block 506, if the network resource provider 106 determines that the percentage of suspended network addresses exceeds the predetermined percentage threshold ("yes" at decision block 506), the process 500 may proceed to block 508. At block 508, the network resource provider 106 may add the specific block of network addresses to the greylist 124 of suspended network addresses for a predetermined time period. In some instances, the amount of time that a network address in the specific block remains on the greylist 124 is dependent on the number of times that the network address was previously on the greylist 124. In other instances, the addition of all the network address in the specific block to the greylist 124 may result in a reset of the suspension time for each network address in the specific block to a new amount of suspension time, regardless of the amount of time that each of the network addresses has already spent on the greylist 124.

However, if the network resource provider 106 determines that the percentage of suspended network addresses does not exceed the predetermined percentage threshold ("no" at decision block 506), the process 500 may proceed to block 510. At block 510, the network resource provider 106 may keep the remaining network addresses of the specific block that are currently not on the greylist 124 off the greylist 124.

The use of an adaptive greylist to temporarily reject authentication requests that originate from a specific source network address may reduce instances of "Hack and Harvest" attacks. Since a malicious actor often carries out a series of "Hack and Harvest" attacks from the same compromised source network address, the use of the adaptive greylist to reject authentication requests from a specific compromised source network address may significantly reduce the amount of malicious network traffic that is experienced by a network resource provider.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   calculating a percentage of successful authentications for a predetermined number of authentication requests that last originated from a source network address;
   in response to determining that the percentage of successful authentications is less than a predetermined percentage threshold at the source network address, adding the source network address to a greylist of suspended network addresses;
   receiving an authentication request initiated by a requesting application, the authentication request including an authentication credential; and
   in response to determining that the authentication request is initiated by the requesting application from the source network address included in the greylist of suspended network addresses, using a random choice algorithm to randomly determine whether to grant the requesting application access to a decoy interface that provides a restricted interaction environment that disallows access to data or services provided by a network resource provider, the random choice algorithm being used without validating the authentication credential included in the authentication request; and
   in response to determining that the authentication request is initiated by the requesting application from another source network address that is absent from the preylist of suspended network addresses, validating the authentication credential to determine whether to grant the requesting application access to the data or the services provided by the network resource provider.

2. The one or more non-transitory computer-readable media of claim 1, wherein the source network address includes an Internet Protocol (IP) address that is assigned to a user device hosting the requesting application that initiated the authentication request.

3. The one or more non-transitory computer-readable media of claim 1, wherein the network resource provider is a wireless carrier network.

4. The one or more non-transitory computer-readable media of claim 1, wherein the acts further comprise removing the source network address from the greylist following an expiration of a predetermined time.

5. The one or more non-transitory computer-readable media of claim 1, wherein the adding the source network address includes:
   determining a number of times that the source network address has been previously added to the greylist of suspended network addresses;
   adding the source network address to the greylist for a random amount of time that is less than or equal to a predetermined time duration threshold following a determination that the number of times is less than or equal to a predetermined threshold number of times; and
   adding the source network address to the greylist for an extended period of time that is longer than the predetermined time duration threshold following a determination that the number of times is greater than the predetermined threshold number of times.

6. The one or more non-transitory computer-readable media of claim 1, further comprising in response to determining that the percentage of successful authentications is equal to or greater than the predetermined percentage threshold at the source network address, keeping the source network address off the greylist of suspended network addresses.

7. The one or more non-transitory computer-readable media of claim 6, wherein a successful authentication of a particular authentication request includes validating a corresponding authentication credential included in the particular authentication request as legitimate for obtaining data or services from a network service provider.

8. The one or more non-transitory computer-readable media of claim 1, wherein the acts further comprise:
   granting the requesting application access to the decoy interface when the random choice algorithm determines that the access to the decoy interface is to be granted; and
   rejecting the authentication request without validating the authentication credential included in the authentication request when the random choice algorithm determines that the access to the decoy interface is to be denied.

9. The one or more non-transitory computer-readable media of claim 1, wherein the acts further comprise:
   receiving an additional authentication request initiated by an additional requesting application at an additional source network address, the additional authentication request including an additional authentication credential; and in response to determining that the additional source network address of the additional authentication request is on a whitelist of authorized network addresses, validating the additional authentication credential to determine whether to grant access to data or services provided by a network resource provider.

10. The one or more non-transitory computer-readable media of claim 1, wherein the acts further comprise:
determining from the greylist a percentage of network addresses in a specific block of network addresses that have been suspended;
in response to the percentage of network addresses exceeding an additional percentage threshold, add the specific block of network addresses to the greylist; and
in response to the percentage of network addresses not exceeding the additional percentage threshold, keeping remaining network addresses of the specific block that are not currently on the greylist off the greylist.

11. The one or more non-transitory computer-readable media of claim 1, wherein the acts further comprise exporting the greylist to a third-party for the third-party to deny additional authentication requests from the suspended network addresses.

12. A system, comprising:
one or more processors; and
memory having instructions stored therein, the instructions, when executed by the one or more processors, cause the one or more processors to perform acts comprising:
calculating a percentage of successful authentications for a predetermined number of authentication requests that last originated from a source network address;
in response to determining that the percentage of successful authentications is less than a predetermined percentage threshold at the source network address, adding the source network address to a greylist of suspended network addresses;
receiving an authentication request initiated by a requesting application, the authentication request including an authentication credential;
in response to determining that the authentication request is initiated by the requesting application from the source network address included in the greylist of suspended network addresses, using a random choice algorithm to randomly determine whether to grant the requesting application access to a decoy interface that provides a restricted interaction environment that disallows access to data or services provided by a network resource provider, the random choice algorithm being used without validating the authentication credential included in the authentication request; and
in response to determining that the authentication request is initiated by the requesting application from another source network address that is absent from the greylist of suspended network addresses, validating the authentication credential to determine whether to grant the requesting application access to the data or the services provided by the network resource provider.

13. The system of claim 12, wherein the acts further comprise, while the source network address is on the greylist:
receiving an account recovery request from the requesting application; and
providing the requesting application with access to at least one of a user identifier recovery function or a password recovery function.

14. The system of claim 12, wherein the source network address includes an Internet Protocol (IP) address that is assigned to a user device hosting the requesting application.

15. The system of claim 12, wherein the acts further comprise:
in response to determining that an additional source network address of an additional authentication request initiated by an additional requesting application is on a whitelist of authorized network addresses, validating an additional authentication credential included in the additional authentication request to determine whether to grant the additional requesting application access to data or services provided by the network resource provider.

16. The system of claim 12, wherein the acts further comprise:
granting the requesting application access to the decoy interface when the random choice algorithm determines that the access to the decoy interface is to be granted; and
rejecting the authentication request without validating the authentication credential included in the authentication request when the random choice algorithm determines that the access to the decoy interface is to be denied.

17. The system of claim 12, wherein the acts further comprise in response to determining that the percentage of successful authentications is equal to or greater than the predetermined percentage threshold, keeping the source network address off the greylist of suspended network addresses.

18. A computer-implemented method, comprising:
calculating a percentage of successful authentications for a predetermined number of authentication requests that last originated from a source network address;
in response to determining that the percentage of successful authentications is less than a predetermined percentage threshold at the source network address, adding the source network address to a greylist of suspended network addresses;
receiving an authentication request initiated by a requesting application, the authentication request including an authentication credential;
in response to determining that the authentication request is initiated by the requesting application from the source network address included in the greylist of suspended network addresses, using a random choice algorithm to randomly determine whether to grant the requesting application access to a decoy interface that provides a restricted interaction environment that disallows access to data or services provided by a network resource provider, the random choice algorithm being used without validating the authentication credential included in the authentication request; and
in response to determining that the authentication request is initiated by the requesting application from another source network address that is absent from the greylist of suspended network addresses, validating the authentication credential to determine whether to grant the requesting application access to the data or the services provided by the network resource provider.

19. The computer-implemented method of claim 18, wherein the source network address includes an Internet Protocol (IP) address that is assigned to a user device hosting the requesting application that initiated the authentication request.

20. The computer-implemented method of claim 18, further comprising removing the source network address from the greylist following an expiration of a predetermined time.

\* \* \* \* \*